J. HEWITT.

Sad and Fluting Irons.

No. 5,302. Reissued March 4, 1873.

*Witnesses:*
Edwin James.
N. E. Gordon.

*Inventor:*
John Hewitt.
per J. E. P. Holmes,
Attorney.

UNITED STATES PATENT OFFICE.

JOHN HEWITT, OF PITTSBURG, PENNSYLVANIA.

IMPROVEMENT IN SAD AND FLUTING IRONS.

Specification forming part of Letters Patent No. 135,116, dated January 21, 1873; reissue No. 5,302, dated March 4, 1873.

*To all whom it may concern:*

Be it known that I, JOHN HEWITT, of Pittsburg, in the county of Allegheny and State of Pennsylvania, did invent certain new and useful Improvements in Sad and Fluting Irons, on which Letters Patent of the United States were granted, bearing date January 21, 1873, and numbered 135,116; and that the following is a full, clear, and exact description of said invention, reference being had to the accompanying drawing and the letters of reference marked thereon making part of this specification, in which—

Figure 1:
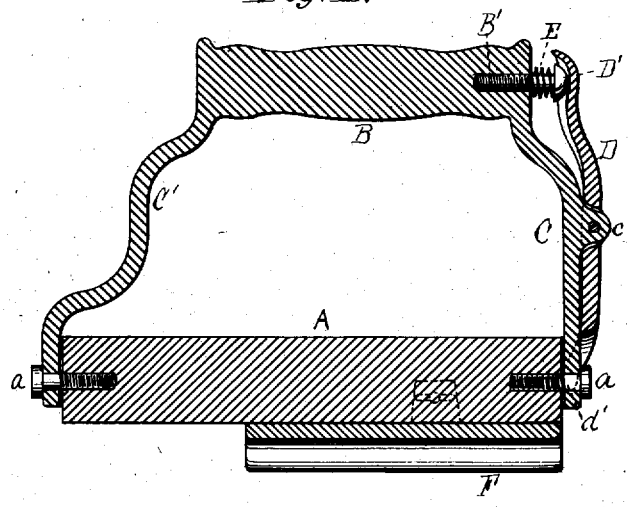
Figure 2:
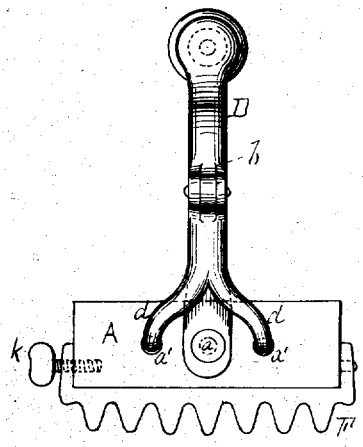
Figure 3:
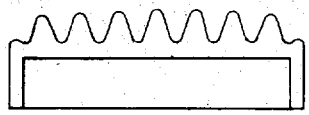

Figure 1 is a longitudinal sectional view. Fig. 2 is a rear view. Fig. 3 is an end view of the independent base-board.

The nature of my invention consists in securing on a reversible iron (one face of which may be finished as a smoothing and the other as a polishing iron, or, if preferred, left rough) a detachable plate of such form or contour as will permit of its face being grooved throughout its entire surface with corrugations of uniform dimensions.

The construction and operation of my invention are as follows: A is the ironing-plate, which is of the usual form, and is constructed of any suitable material. If desired, both of the faces of the plate A may be finished for use as a sad-iron or polishing-iron; or, if preferred, only one may be so finished, leaving the other rough and unpolished. B is the handle, and C C′ are its shanks. These shanks C C′ are of such contour as to permit of the free revolution of the iron plate A when attached in and between the same. The shanks C C′ are secured to the iron plate A at pivot-centers *a a*, on which the plate freely turns, and which permits of its being reversed at pleasure. The heel-shank C of the handle is cast or otherwise formed with a tongue or projection, *c*, at or near its center, and over which fits the slot *b* cast in the thumb-latch D, and to which it is pivoted. The dimensions of the slot *b* and tongue *c* are such as to permit of the free movement of the former over and around the latter. The thumb-latch D is cast with a bearing-pin, D′, at its upper section, which enters and rests in a slot, B′, of the handle. The thumb-latch D is cast with forked arms *d d* at its lower section, and which are provided with right-angular pins or prongs *d′ d′*. These forked arms *d d* open and extend down on the opposite sides of the pivot bearing *a* of the shank C, and, the pins or prongs *d′ d′* entering holes *a′ a′* in the heel of the iron, a firm and secure bearing is afforded, and one that prevents all movement of the plate during the process of either ironing or fluting. E is a spring, and encircles the pin D′ of the latch, and has its bearings between the latch and handle. The tension of this spring is constantly exerted to drive the pins *d′ d′* in the holes *a′ a′* of the iron plate, and thus to secure the iron plate A in a flat position for use; but simply by depressing the upper end of the thumb-latch, so as to overcome the tension of the spring E, the prongs *d′ d′* are instantly withdrawn, and the iron can be reversed at pleasure and heated from its upper side, which protects its polished face as well as the fluting-plate F when the same is attached. This fluting-plate F may be cast, or stamped, or struck up out of any suitable metal. I usually give to this plate a square, rectangular, or other form that will permit of its being corrugated throughout its entire length with corrugations of uniform dimensions; but, if preferred, it may be made to correspond in shape with the iron in connection with which it is to be used, or of any other desired form. This plate F is provided with bearings, by which it is attached to and secured on the iron A.

Bearings, as shown in the drawing, with pins on the iron, and a thumb-screw, *k*, afford an exceedingly convenient means of attachment; but any other style of bearings and fastening that will accomplish the desired result may be substituted, and an equally effective fluting device is obtained.

What I claim as new, and desire to secure by Letters Patent of the United States, is—

The reversible iron A, having holes *a′ a′* arranged as shown, handle B, corrugated plate F, and spring thumb-latch D having forked arms *d d* provided with bearing-pins *d′ d′*, when the whole is so combined and arranged as to operate substantially as described.

In testimony whereof I have signed my name to this specification before two subscribing witnesses.

JOHN HEWITT.

Witnesses:

EDWIN JAMES,

JOS. T. K. PLANT.